United States Patent [19]
Kodama et al.

[11] Patent Number: 5,089,921
[45] Date of Patent: Feb. 18, 1992

[54] INCLINED RAIL CASSETTE TAPE LOADING AND GUIDING MECHANISM

[75] Inventors: Yoshimi Kodama, Kobe; Yoshinisa Ohnishi, Takarazuka, both of Japan

[73] Assignee: Sanyo Electric Co., Ltd., Osaka, Japan

[21] Appl. No.: 687,093

[22] Filed: Apr. 19, 1991

Related U.S. Application Data

[63] Continuation of Ser. No. 311,264, Feb. 16, 1989, abandoned.

[30] Foreign Application Priority Data

Feb. 17, 1988 [JP] Japan ................................ 63-35650
Aug. 19, 1988 [JP] Japan ................................ 63-206574

[51] Int. Cl.⁵ ............................................. G11B 15/665
[52] U.S. Cl. ............................................ 360/95; 360/85
[58] Field of Search ................................ 360/85, 95; 242/197-201

[56] References Cited

U.S. PATENT DOCUMENTS 4,620,245 10/1986 Shimizu ................................ 360/85
4,672,479 6/1987 Takao et al. ........................ 360/95

FOREIGN PATENT DOCUMENTS 60-18850 1/1985 Japan ................................ 360/85

Primary Examiner—A. J. Heinz
Assistant Examiner—Jefferson Evans
Attorney, Agent, or Firm—Armstrong, Nikaido, Marmelstein, Kubovcik & Murray

[57] ABSTRACT

A tape loading mechanism for withdrawing a magnetic tape from a tape cassette includes a pair of rails, each formed in a plane, for guiding the movement of a pair of tape guide assemblies, respectively. At least one of the rails is inclined with respect to a cylinder base. The tape guide assembly on the inclined rail is positioned at a lower level than the tape in the cassette when the tape is to be loaded, is brought to the same level as the tape during loading and engages the tape at this level to further withdraw the tape from the cassette.

10 Claims, 13 Drawing Sheets

INCLINED RAIL CASSETTE TAPE LOADING AND GUIDING MECHANISM

This application is a continuation of application Ser. No. 311,264 filed Feb. 16, 1989, now abandoned.

FIELD OF THE INVENTION

The present invention relates to magnetic recording-reproduction apparatus such as 8-mm VTRs and digital audio tape recorders, and more particularly to a tape loading mechanism for withdrawing magnetic tape from a tape cassette.

BACKGROUND OF THE INVENTION

With reference to FIGS. 1B and 17, common VTRs include a head cylinder 2 inclined at a specified angle and mounted on a cylinder base 1, and a pair of circular-arc rails 30a, 30b arranged around the head cylinder 2. Tape guide assemblies 50a, 50b are slidably mounted on the rails 30a, 30b, respectively. The guide assemblies 50a, 50b are moved along the respective rails to thereby withdraw magnetic tape 71 from a tape cassette 7 and wind the tape around the head cylinder 2 over a predetermined angle about the center thereof.

As shown in FIG. 24, the tape guide assembly 50a comprises guides 53, 54 provided on the upper side of a slide base 52 for withdrawing the tape, a rod 58 projecting from the lower side of the base 52 and extending through a guide slit 32 of the rail 30a, and a pair of slide pieces 101, 101 provided on the respective opposite sides of the slide base 52. Pulling drive means comprising a loading ring, etc. is connected to the lower end of the rod 58 by a connector as will be described later to exert on the guide assembly 50a a pulling force acting longitudinally of the guide slit 32 of the rail.

Usually, one of the pair of rails, 30b, is formed along a plane and disposed approximately horizontally above the cylinder base 1, whereas the other rail 30a is curved to include a bent portion R and inclined with respect to the cylinder base 1 (see, for example, Unexamined Japanese Patent Publications SHO 60-87458, SHO 59-171070 and SHO 60-35364). Accordingly, the guide assembly 50a on the curved rail 30a is held at the same level as the cassette 7 as indicated in solid line before starting to load the tape, gradually rises as it advances with a loading operation, and reaches a predetermined level as indicated in broken line on completion of the loading operation. At the higher level, the assembly 50a is held as inclined. As seen in FIG. 17, consequently, the magnetic tape 71 withdrawn from the cassette 7 is wound at a predetermined angle of inclination around the head cylinder 2.

With reference to FIG. 24, the guide assembly 50a at the end of path of its movement is positioned by the contact of the pair of slide pieces 101, 101 at opposite sides of the slide base 52 with the rail 30a with respect to the direction of Z axis shown (axial direction of the rod 58), and also by the contact of the rod 58 projecting downward from the slide base with the slit (32) defining side wall of the rail 30a with respect to the direction of X axis (perpendicular to the Z axis).

Further with the conventional VTR, the path of travel of the tape from a supply reel 72 to the head cylinder 2 when the tape is completely loaded as seen in FIG. 17 is provided by a tape drawing guide 63, first to third tape guides 9, 91, 92 and the pair of guides 53, 54, and all of these tape guides 63, 91, 92, 53, 54 other than the first tape guide 9 are mounted on a pivotal arm (not shown) operatively related to the loading movement. These movable guides advance with the loading movement and withdraw the magnetic tape 71 in sliding contact with the nonmagnetic side of the tape 71 to form the specified tape travel path.

With the conventional VTR wherein the supply rail 30a is curved and includes the bent portion R, the tape supply guide assembly 50a must have some play relative to the rail 30a. Consequently, the play causes a backlash. Especially with compact 8-mm VTRs wherein the rail 30a is spaced from the head cylinder 2 by a small distance, the guide assembly 50a is likely to come into contact with the head cylinder 2 during tape loading. To preclude the backlash, the portion where the guide assembly 50a is in engagement with the rail 30a requires complex means for absorbing the play.

Further in the arrangement of FIG. 24 for positioning the guide assembly 50a in place, the assembly is positioned with respect to the direction of X axis by the line contact between the periphery of the rod 58 and the guide slit (32) defining side wall of the rail 30a, so that owing to variations in the accuracy with which the guide slit 32 is machined, the rod 58 is likely to contact the upper edge of the slit defining wall or the lower edge thereof. This results in variations in the accuracy with which the guide assembly is positionable, making it difficult to position the assembly properly.

The conventional VTR has another problem in that the loading mechanism is very complex because the multiplicity of tape guides 63, 91, 92, 53, 54 need to be arranged movably as seen in FIG. 17 to provide the travel path for the tape as completely loaded and further because a link assembly is necessary for driving these guides forward and rearward.

These problems impose limitations on attempts to provide lightweight and compacted loading mechanisms for 8-mm VTRs.

SUMMARY OF THE INVENTION

An object of the present invention is to prevent the backlash involved in the movement of the tape guide assembly by a simple construction so as to provide a tape loading mechanism having a simple construction.

Another object of the invention is to provide a tape loading mechanism wherein the tape guide assembly can be positioned accurately at the end of its movement.

Another object of the invention is to provide the desired path of travel of tape by a minimized number of movable tape guides and to thereby provide a tape loading mechanism of simple construction.

With the tape loading mechanism of the present invention, a pair of rails are formed each in a plane, and at least one of the rails is inclined with respect to a cylinder base. A tape guide assembly on the inclined rail is positioned at a lower level toward the cylinder base than the level of the magnetic tape in a tape cassette when the tape is to be loaded, is brought to the same level as the tape in the course of loading operation and comes into contact with the tape at this level. The guide assembly thereafter further withdraws the tape from the cassette and winds the tape around a head cylinder.

The side wall of the rail which defines a guide slit formed therein and with which a rod on the tape guide assembly comes into contact is formed with a contact portion having an edged section and serving as stopper means for limiting the movement of the tape guide assembly.

Further with the tape loading mechanism of the invention, three fixed tape guides for the magnetic side of the magnetic tape to come into contact with provide a path of travel of the tape between the tape guide assembly on the inclined rail and the tape cassette.

The tape guide assembly on the inclined rail moves on a plane for a loading operation, performing a first movement wherein the assembly advances without contacting the magnetic tape of the cassette and a second movement wherein the assembly comes into contact with the tape to further withdraw the tape from the cassette and wind the tape around the head cylinder.

During the first movement, the tape in the cassette is withdrawn from the cassette, for example, by tape drawing guides movable with the loading operation. The tape is thereafter wound around the head cylinder by the second movement of the tape guide assembly.

With respect to a direction perpendicular to the longitudinal direction of the rail, the tape guide assembly is positioned in place at the end of its movement by the point contact of the rod projecting from the guide assembly with the contact portion formed in the guide slit defining side wall of the rail.

The magnetic tape withdrawn from the cassette, for example, by the tape drawing guides comes into contact with the three fixed tape guides during the loading operation, and these fixed tape guides define the path of travel of the tape after the tape is completely loaded.

The magnetic tape can be changed in its course as specified by the tape guide in an intermediate position included in these three tape guides, and the other two tape guides regulate the angle at which the tape is wound around the tape guide in the intermediate position.

With the tape loading mechanism of the present invention, the two rails for guiding the movement of a pair of tape guide assemblies are each formed in a plane, so that each tape guide assembly is reciprocatingly movable in a stabilized posture without the necessity of giving the undesired play to the tape guide assembly in engagement with the rail. Consequently, there is no need to provide any special means for preventing the tape guide assembly from backlashing. This serves to simplify the tape loading mechanism.

With respect to a direction perpendicular to the longitudinal direction of the rail, the tape guide assembly is positionable in place at the end of its movement by the point contact of the rod with the rail as already described. This assures accurate positioning at all times.

The change in the course of the magnetic tape required for forming the predetermined path of its travel can be accomplished by the three fixed tape guides which are disposed outside the path, so that the movable tape guides to be disposed inside the travel path can be smaller in number than is conventionally needed. This serves to simplify the tape loading mechanism.

BRIEF DESCRIPTION OF THE DRAWINGS

FIG. 5 is a plan view of the same when starting loading;

FIG. 6 is a plan view of the same while a first tape guide assembly is in a first movement;

FIG. 7 is a plan view of the same upon tape drawing guides completing withdrawing the tape;

FIG. 8 is a plan view of the same while the tape guide assembly is in a second movement;

FIG. 9 is a plan view of the same on completion of the loading operation;

DETAILED DESCRIPTION OF EMBODIMENT

With reference to the drawings, a tape loading mechanism will be described in detail which embodies the invention for use in an 8-mm VTR.

Figure 1A:
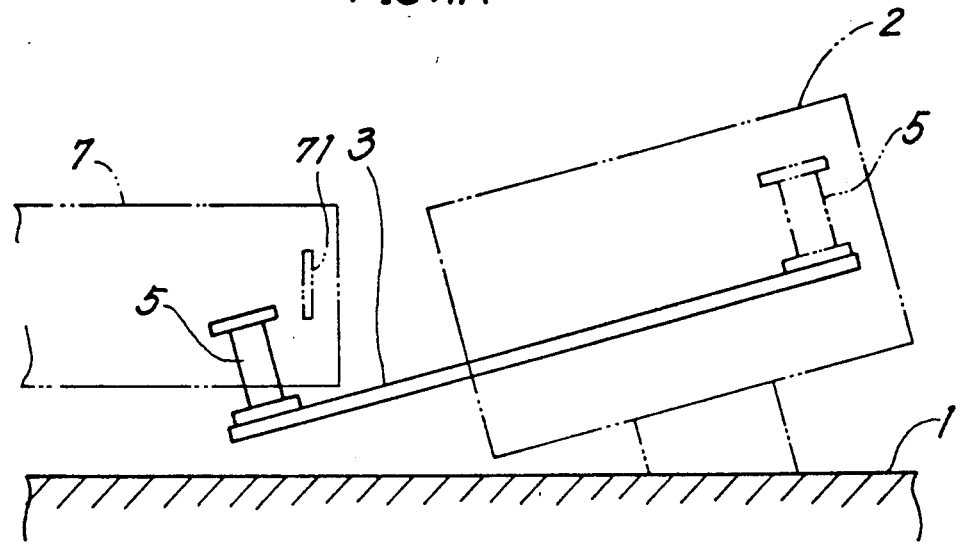
FIG. 1A is a side elevation showing a feature of the tape loading mechanism of the invention.
Figure 1B:
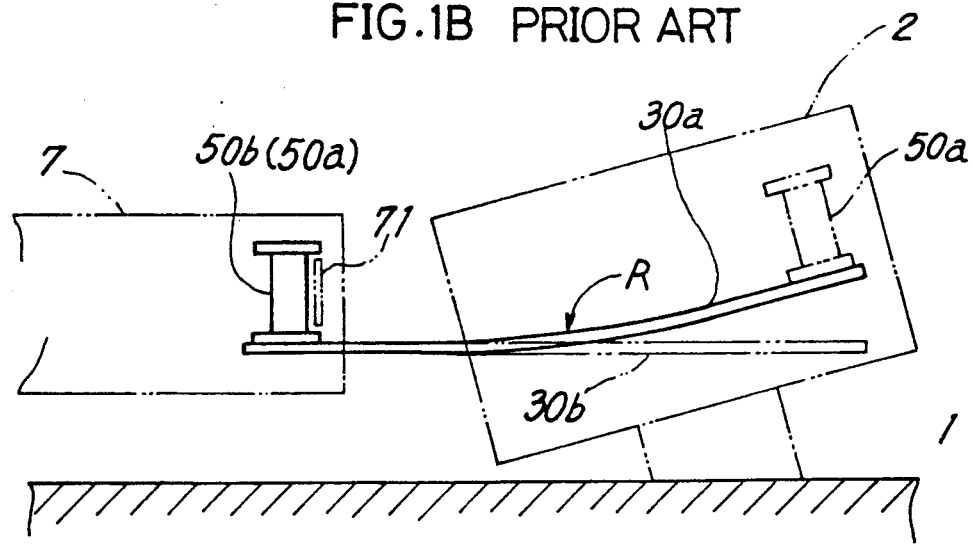
FIG. 1B is a side elevation corresponding to FIG. 1A and showing a conventional tape loading mechanism.

Referring to FIG. 1A, the tape loading mechanism of the invention is characterized in that a supply rail 3 is formed in a plane and inclined with respect to a cylinder base 1.

A tape guide assembly 5 on the inclined rail 3 is positioned at a lower level toward the cylinder base 1 than magnetic tape 71 accommodated in a tape cassette 7 when the tape is to be loaded, and is brought to the same level as the tape 71 during loading. At the latter level, the tape guide assembly 5 comes into contact with the tape 71, further withdraws the tape from the cassette 7 and winds the tape around head cylinder 2.

Figure 2:
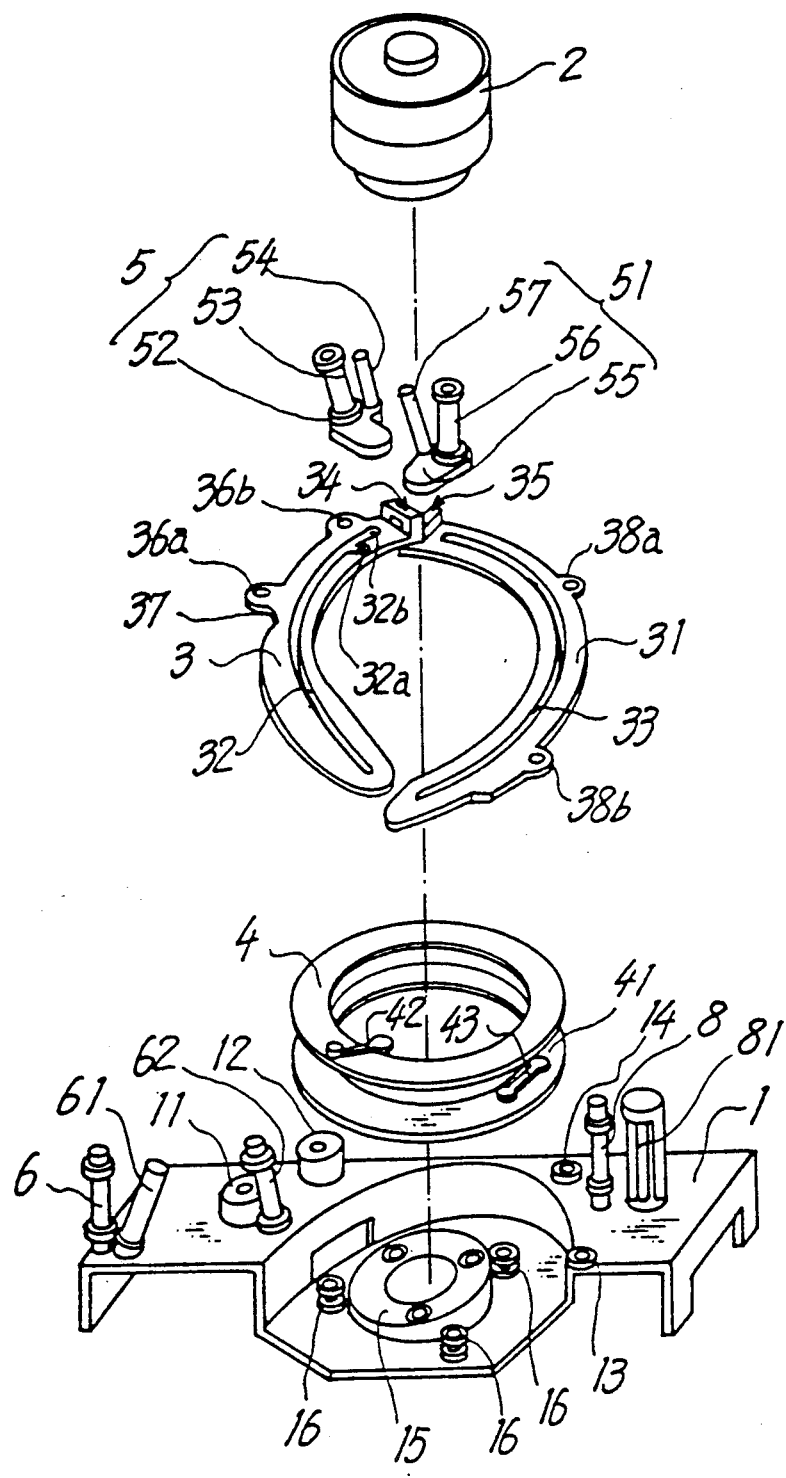
FIG. 2 is an exploded perspective view showing a head cylinder and the tape loading mechanism of the invention.

With reference to FIG. 2, a cylinder support 15 is disposed at the center of the cylinder base 1, and the head cylinder 2 is mounted as inclined at a predetermined angle on the support 15. Arranged around the cylinder support 15 are ring drive rollers 16, 16, 16 for drivingly rotating a pair of loading rings 4, 41 in directions opposite to each other as already known.

Provided on the cylinder base 1 are three fixed tape guides for providing a specified path of travel of the tape when the tape has been completely loaded, i.e., first tape guide 6, second tape guide 61 and third tape guide 62 on the supply side. Also arranged on the base 1 are a take-up tape guide 8, and a capstan 81 for forwarding the tape.

The second tape guide 61 on the supply side serves to change the course of the tape 71 as specified on completion of loading. The first and third tape guides 6, 62 regulate the angle at which the tape 71 is wound around the second tape guide 61. The tape guide assembly 5 comprises leading guides 53, 54 which are inclined at the same angle as the third tape guide 62.

Further provided on the cylinder base 1 are a pair of supply-side support pieces 11, 12 for supporting the supply rail 3 as inclined at a predetermined angle, and a pair of take-up side support pieces 13, 14 for supporting a take-up rail 31 horizontally.

The supply rail 3 and the take-up rail 31 each extend in a circular-arc form in a plane and are formed with guide slits 32, 33, respectively, along their length. The rails 3, 31 are integrally formed each at its innermost end with stoppers 34, 35, respectively, as by die casting for limiting the movement of the guide assemby 5 and a tape guide assembly 51.

With reference to FIGS. 18 to 22, the stopper 34 of the supply rail 3 comprises a plurality of contact portions including a gate-shaped contact member 34a for the forward end 100 of a slide base 52 of the tape guide assembly 5 to advance therethrough, a contact portion 32a of the side wall of the rail 3 defining the guide slit 32 for a first rod 58 projecting downward from the bottom of the slide base 52 to come into contact with, and the terminal end 32b of the rail 3 for a second rod 59 projecting downward from the bottom of the base 52 to come into contact with.

As seen in FIG. 2, the rails 3, 31 are formed on their outer edges with boss portions 36a, 36b and 38a, 38b, respectively, which are fastened to the supply-side support pieces 11, 12 and the take-up side support pieces 14, 13 with screws.

The boss portion 36a of the rail 3 is positioned approximately at the midportion of the rail, and the other boss portion 36b thereof is adjacent to the stopper 34. The rail portion beyond the boss portion 36a toward the rail outer end is supported above the cylinder base 1 in a cantilever fashion. Immediately adjacent to the boss portion 36a toward the outer or free end, the rail has an arcuate cutout 37. Accordingly, even if the support rail 3 is subjected to a bending external force as by the tape guide assembly 5 upon the start of loading, the force will be absorbed by the elastic deformation of the rail portion of reduced width where the cutout 37 is formed. Consequently, the stopper 34 can be maintained in position accurately. This structure is usable also for the take-up rail 31.

The supply-side tape guide assembly 5 has its slide base 52 slidably fitted in the guide slit 32 of the rail 3, and the first and second leading guides 53, 54 are provided on the base 52. Similarly, the take-up tape guide assembly 51 comprises a slide base 55 slidably fitted in the guide slit 33 of the rail 31, and first and second leading guides 56, 57 projecting upward from the base 55.

The guide assemblies 5, 51 are connected to the loading rings 4, 41 by connectors 42, 43, respectively.

Figure 12:
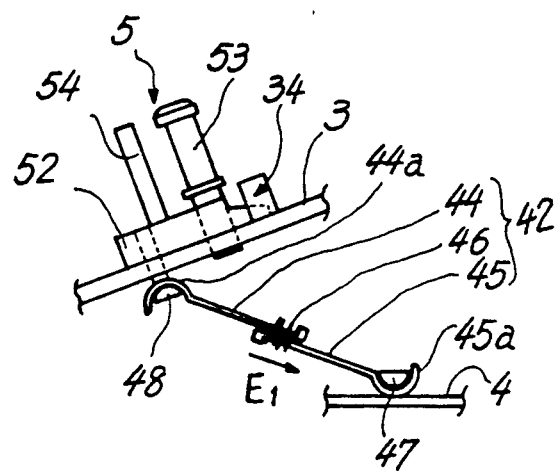
FIG. 12 is a side elevation showing a connector between the tape guide assembly and a loading ring on completion of the loading operation.
Figure 13:
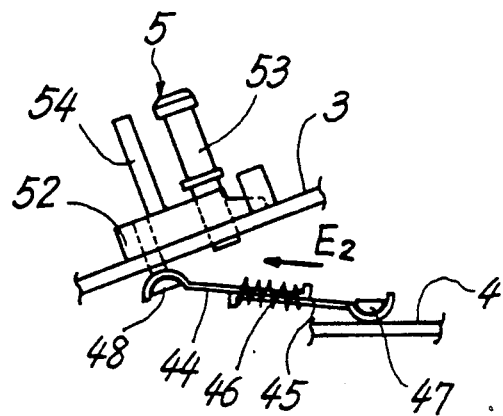
FIG. 13 is a side elevation showing the same on completion of unloading.
Figure 14:
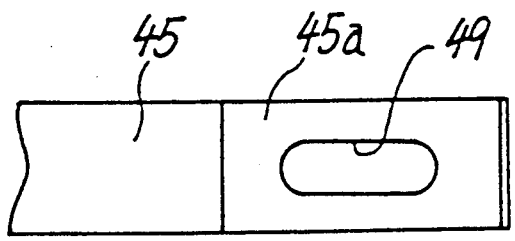
FIG. 14 is a fragmentary plan view of an arm constituting the connector.

The supply rail 3 is connected to the loading ring 4 by the structure shown in FIGS. 12 to 15. The connector 42 comprises first and second arms 44, 45 in engagement with each other stretchably axially thereof, and a spring 46 is provided between the two arms. The arms 44, 45 are provided at their outer ends with arcuate bent portions 44a, 45a each having a slot 49 extending longitudinally of the arm as seen in FIG. 14. The rail 3 and the loading ring 4 have semispherical pivot support pieces 48, 47, respectively, attached thereto by a slender stem (indicated at 47a in FIG. 15) fitted in each slot 49.

Figure 15:
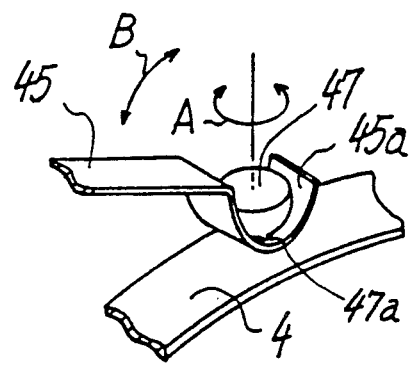
FIG. 15 is a perspective view showing pivot connection means.

Accordingly the bent portions 44a, 45a of the arms 44, 45 are movable relative to the support pieces 48, 47 in the direction of rotation of arrow A and in the direction of arrow B shown in FIG. 15, whereby pivot connection means are provided.

With the arrangement of FIG. 12, the slide base 52 comes into contact with the stopper 34 on completion of loading, and the loading ring 4 further slidingly moves rightward in FIG. 12, pulling the arm 45 in the direction of arrow E1. This compresses the spring 46, forcing the two arms 44, 45 toward each other and thereby bringing the tape guide assembly slide base 52 into pressing contact with the stopper 34 to accurately determine the position and posture of the guide assemblies 53, 54.

On completion of unloading, the loading ring 4 comes into contact with the end of the supply rail 3 at the extemity of the guide slit 32, and the ring 4 further slidingly moves leftward in FIG. 13 to force the arm 45 in the direction of arrow E2. This stretches the spring 46, biasing the two arms 44, 45 away from each other with a force weaker than that acting on completion of loading, whereby the slide base 52 is pressed against the end of the rail 3 defining the extremity of the guide slit to determine the position of the guide assembly 5.

The take-up tape guide assembly 51 is also connected to the loading ring 41 by the same structure as above.

Figure 3:
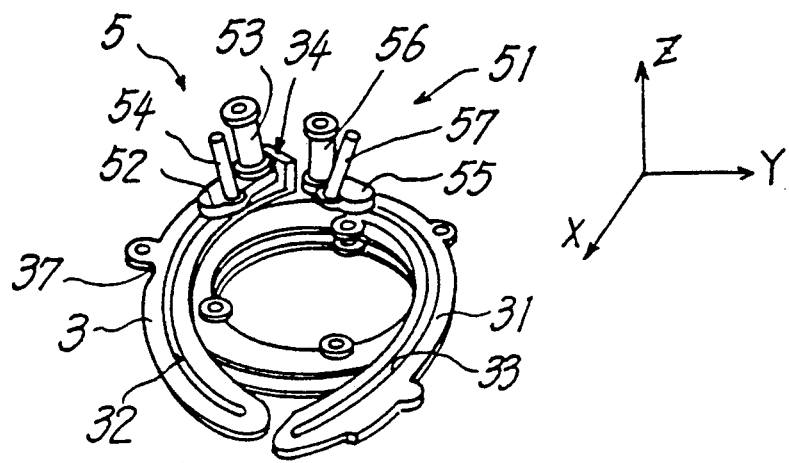
FIG. 3 is a perspective view of the mechanism on completion of a loading operation.
Figure 4:
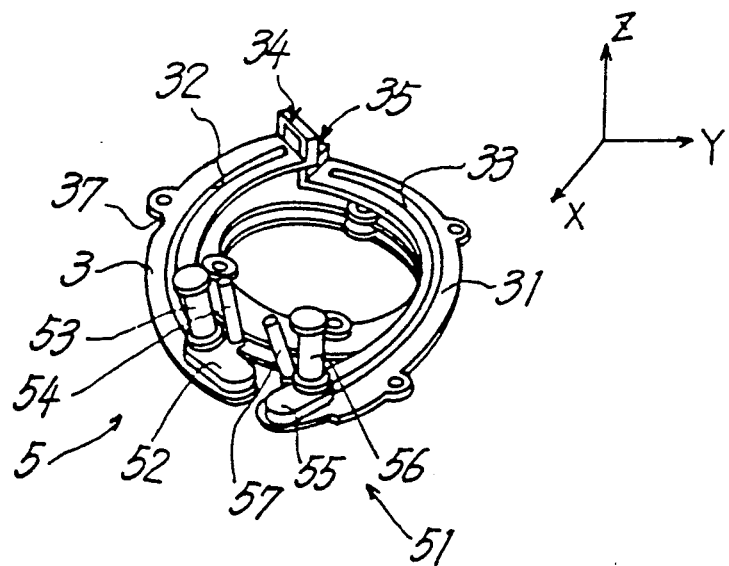
FIG. 4 is a perspective view of the same on completion of an unloading operation.

In the tape loading operation, the loading ring 4 for driving the supply-side guide assembly 5 rotates clockwise, while the loading ring 41 for driving the take-up guide assembly 51 rotates counterclockwise. Consequently, the two guide assemblies 5, 51 advance along the respective rails 3, 31 from the position of FIG. 4 to the position of FIG. 3. During this movement, the leading guides 53, 54 of the guide assembly 5 move obliquely upward along the supply rail 3 as held inclined at an angle of 15 degrees with the Z axis shown and about 21 degrees with the X axis. On the other hand, the leading guides 56, 57 of the take-up guide assembly 51 move along the rail 31 while remaining at the same level.

FIGS. 18 to 23 show the structure of the stopper 34 on the supply rail 3 and the tape guide assembly 5 as engaged with the stopper.

Figure 22:
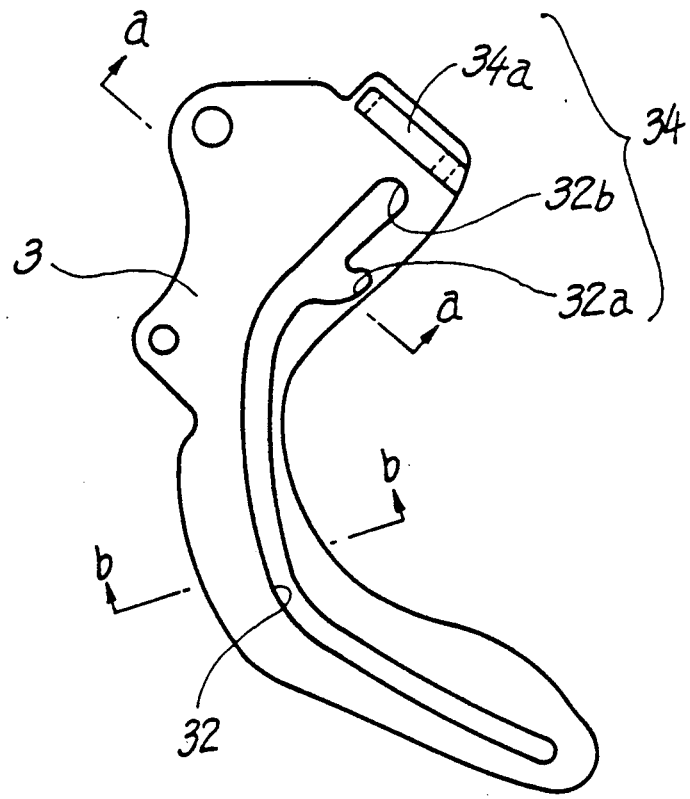
FIG. 22 is a plan view of the supply rail.
Figure 23A:
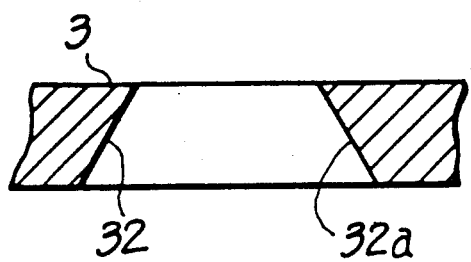
FIG. 23A is a view in section taken along the line a—a in FIG. 22.
Figure 23B:
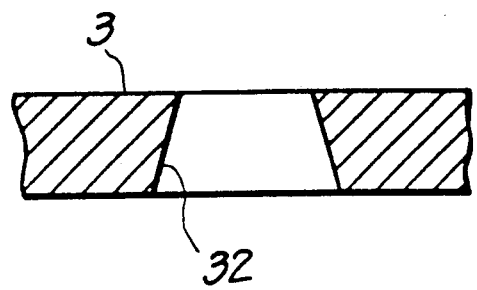
FIG. 23B is a view in section taken along the line b—b in FIG. 22.

With reference to FIG. 22, the rail 3 has formed in its guide slit 32 close to its terminal end 32b the side wall contact portion 32a for the first rod 58 to bear against. As seen in FIGS. 23A and 23B, the slit 32 has an upwardly tapered cross section over the entire length thereof.

As shown in FIGS. 18 to 21, the slide base 52 of the guide assembly 5 is formed on the upper face of its forward end 100 with a first protuberance 52a adapted to come into contact with the top wall of the gate-shaped contact member 34a. The slide base 52 also has on its lower face second and third protuberances 52b, 52c in sliding contact with the upper face of the rail 3 at opposite sides of the guide slit 32.

The first and second rods 58, 59 projecting from the lower face of the slide base 52 are arranged along the direction of its movement, with the connector 42 attached to the first rod 58. When the tape guide assembly 5 reaches the end of path of its movement upon completion of tape loading, the first rod 58 bears against the edge of the side wall contact portion 32a formed in the vicinity of the terminal end of the guide slit 32, with the second rod 59 bearing against the terminal end 32b of the rail 3 at the extremity of the guide slit 32.

In this state, the tape guide assembly 5 is in balance with the following moments of forces.

With reference to FIGS. 18 to 21, the Y axis is an axis of coordinate intersecting the axes of the first and second rods 58, 59 of the guide assembly 5 at right angles therewith, the Z axis is a coordinate axis in coincidence with the axis of the first rod 58, and the X axis is a coordinate axis perpendicular to both the Y and Z axes.

Suppose the pulling drive force acting on the connector 42 is F, a component of the force F in the X—Y plane (FIG. 19) is Fxy, a component thereof in the Y—Z plane (FIG. 20) is Fyz, and a component thereof in the X—Z plane (FIG. 21) is Fxz.

Figure 19:
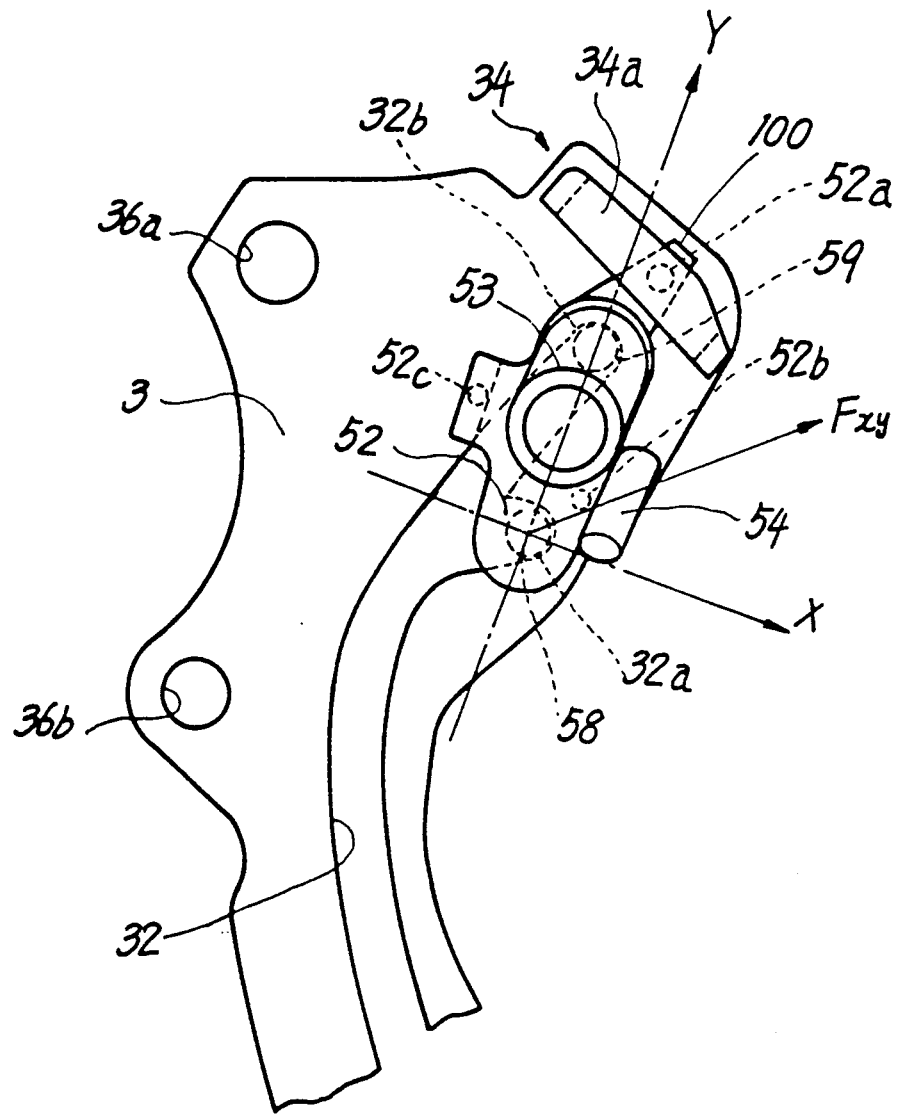
FIG. 19 is a plan view of the same.

The moment acting on the guide assembly due to the component Fxy is in balance with the reaction exerted by the side wall contact portion 32a of the rail 3 on the first rod 58 and acting about the second rod 59 as seen in FIG. 19.

Figure 20:
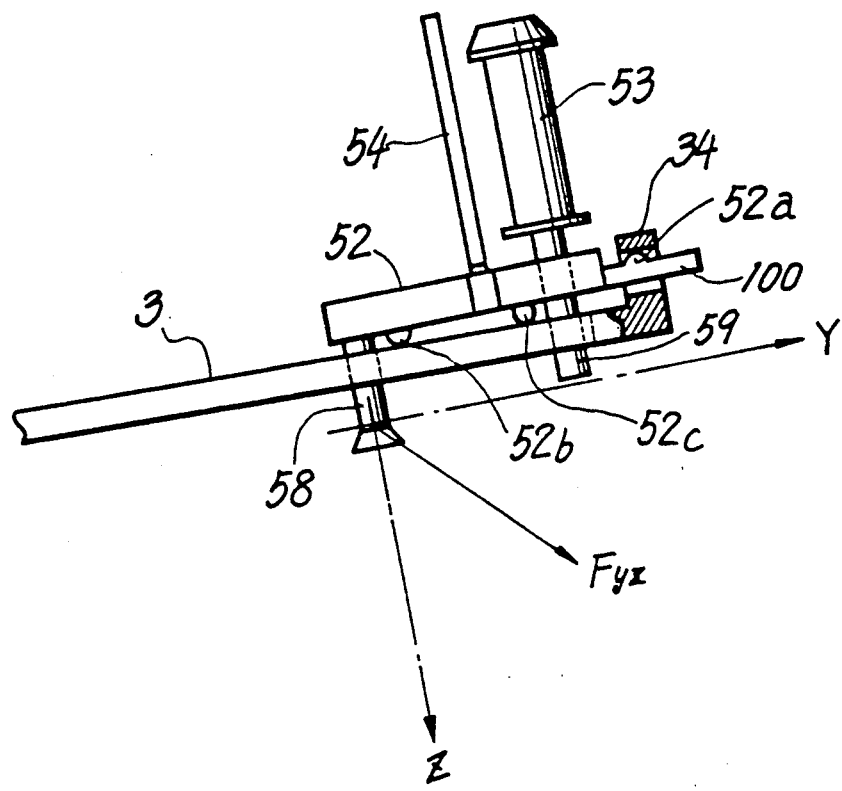
FIG. 20 is a side elevation partly broken away and showing the same.

The moment due to the component Fyz is in balance with the reaction exerted by the rail upper face on the second and third protuberances 52b, 52c and acting about the first protuberance 52a of the assembly 5 as seen in FIG. 20.

Figure 21:
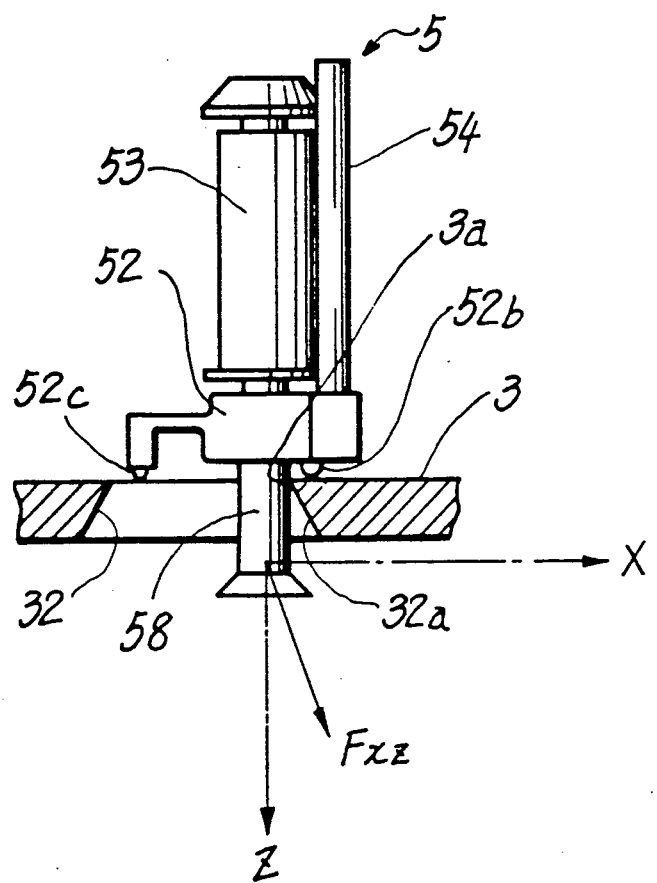
FIG. 21 is a front view partly broken away and showing the same.

The moment due to the component Fxz is in balance with the reaction exerted by the rail upper face mainly on the third protuberance 52c and acting about the point of contact, 3a, between the first rod 58 of the assembly 5 and the side wall contact portion 32a of the rail 3 as shown in FIG. 21.

Consequently, the tape guide assembly 5 is held pressed in position.

The stopper described is of course usable also for the tape guide assembly 51 on the take-up rail 31.

The operation of the tape loading mechanism will be described below with reference to FIGS. 5 to 9. The VTR incorporating the present embodiment is of the type wherein the tape cassette 7 is drivingly advanced toward the head cylinder 2 during the period from the start of loading until the completion of loading (see, for example, Unexamined Japanese Patent Publication SHO 61-271648). Accordingly, the distance L1 between the front end of the cylinder base 1 and the front end of the tape cassette 7 when the loading operation is to be started as seen in FIG. 5 gradually decreases to L2 in FIG. 6, then L3 in FIG. 7, further L4 in FIG. 8 and finally to the state of completion of loading shown in FIG. 9.

Figure 5:
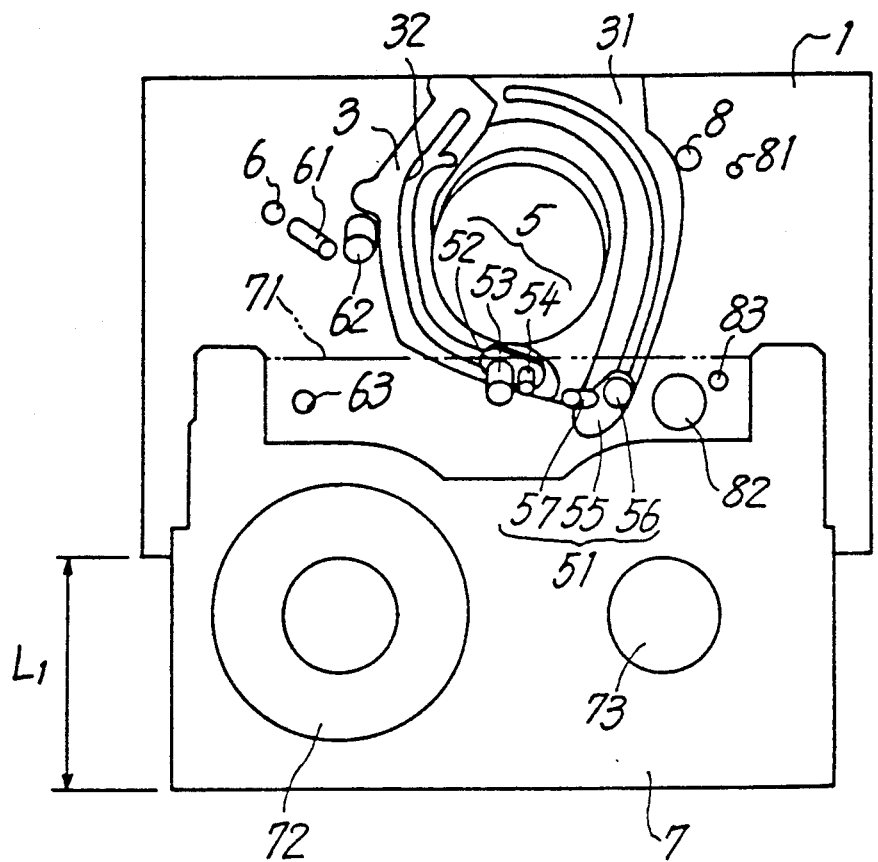
FIGS. 5 to 9 show the tape loading mechanism in sequential operation from the start of loading until completion of loading.
Figure 10:
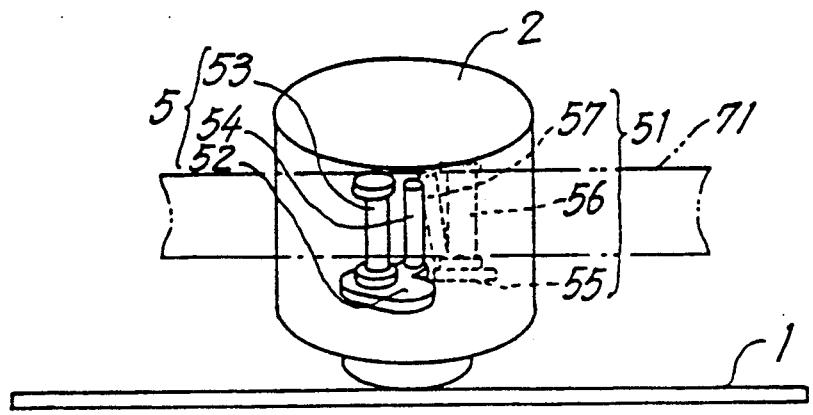
FIG. 10 is a front view showing the tape guide assembly as positioned at a level when starting the loading operation.

When the mechanism is to start loading as seen in FIG. 5, tape drawing guides 63, 83, the supply-side guide assembly 5, the take-up side guide assembly 51 and a pinch roller 82 are accommodated in the opening of the tape cassette 7. At this time, the take-up side guide assembly 51 is at the same level as the magnetic tape 71 as shown in FIG. 10, whereas the supply-side guide assembly 5 is at a lower level than the tape 71.

Figure 6:
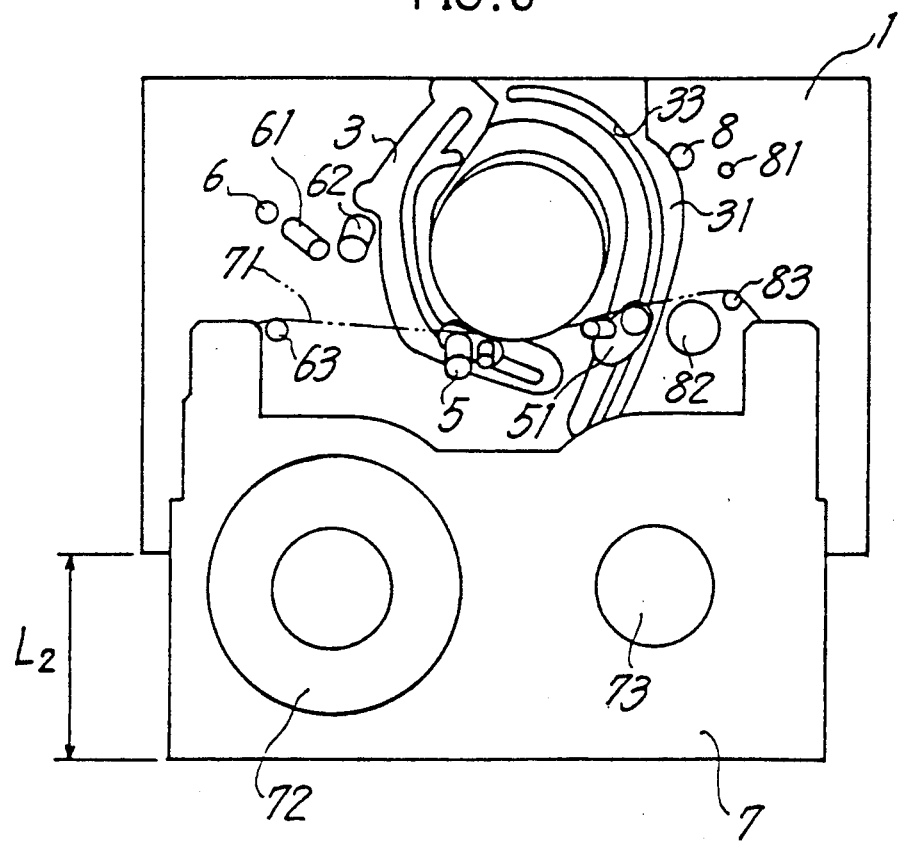

In this state, the loading motor (not shown) is started, whereupon the guide assemblies 5 and 51 start advancing as seen in FIG. 6. Approximately at the same time, both the tape drawing guides 63, 83 start to withdraw the tape 71. At this time, the take-up guide assembly 51 is in contact with the tape 71, whereas the supply-side guide assembly 5 is away from the tape 71.

Figure 7:
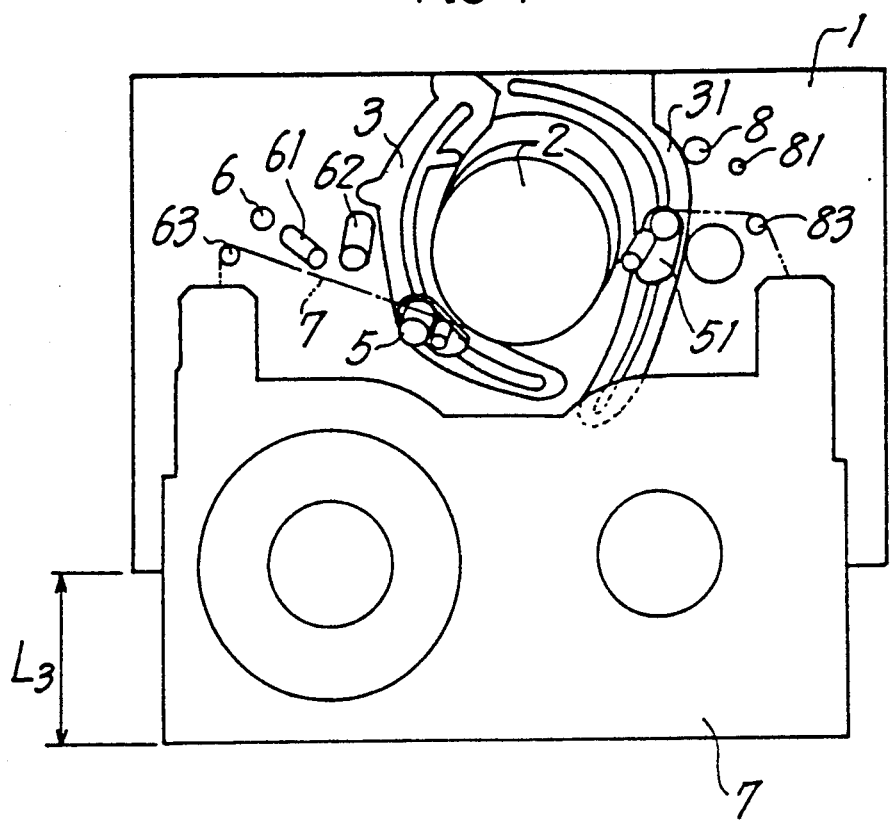
Figure 11:
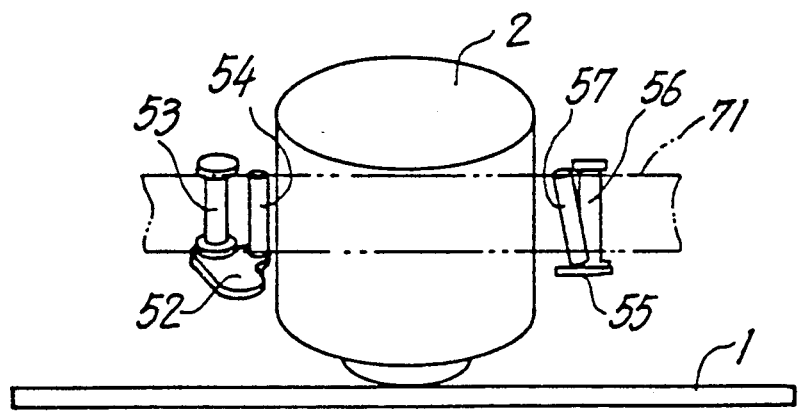
FIG. 11 is a front view showing the tape guide assembly as positioned at a level immediately before completion of the first movement.

When the loading operation advances, the tape drawing guides 63, 83 completely withdraw the tape as shown in FIG. 7. The guide assembly 51 further advances to wind the tape 71 around the head cylinder 2, whereas the guide assembly 5, still remaining away from the tape 71, rises as it advances along the supply rail 3, with the first and second leading guides 53, 54 brought approximately to the same level as the tape 71 as seen in FIG. 11. Accordingly, when the guide assembly 5 comes into contact with the tape 71 immediately thereafter, the flanges at the heads of the leading guides 53, 54 will not contact the tape 71 to render the tape 71 free of damage.

Figure 8:
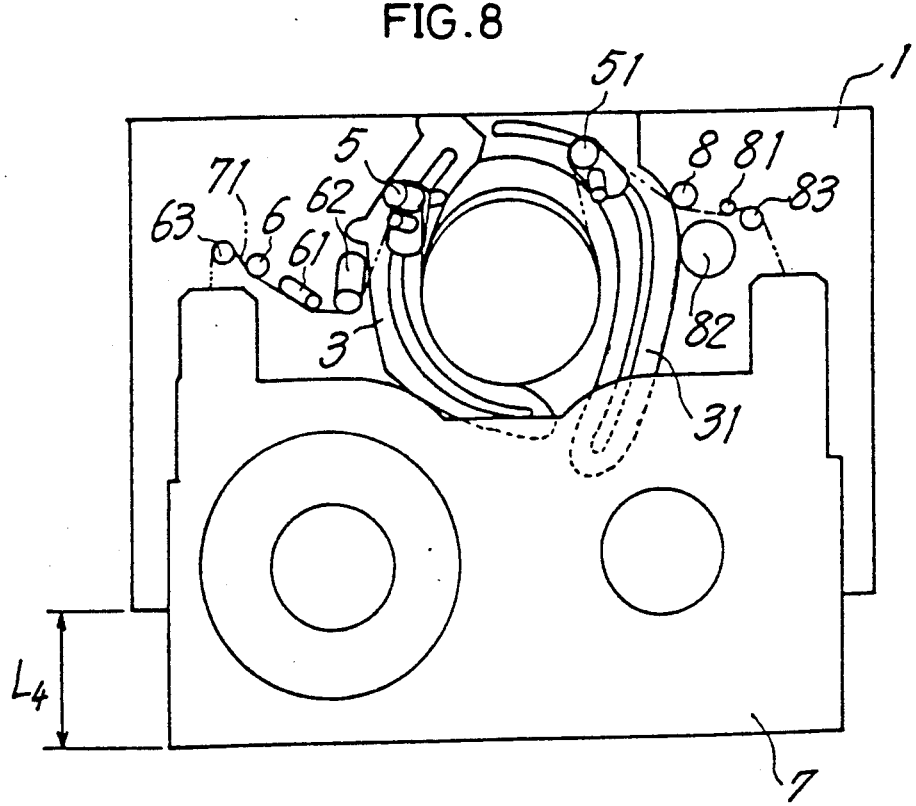

FIG. 8 shows the supply tape guide assembly 5 and the take-up tape guide assembly 51 as further advanced. The magnetic tape 71 is in contact with the first tape guide 6, second tape guide 61, third tape guide 62 and guide assembly 5 on the supply side, and with the take-up tape guide 8 and capstan 81.

During the process from FIG. 7 to FIG. 8, the tape 71 is first passed around the first to third tape guides 6, 61, 62 and is thereby changed in course generally toward the direction in which it is traveled when completely loaded, whereupon the guide assembly 5 comes into contact with the tape 71. Accordingly, it is unlikely that the tape 71 will be twisted or otherwise deformed by being handled by the assembly 5 for loading.

Further in the state shown in FIG. 8, the pinch roller 82 is still out of contact with the tape and therefore offers no undesirable resistance to the tape withdrawing action.

Figure 9:
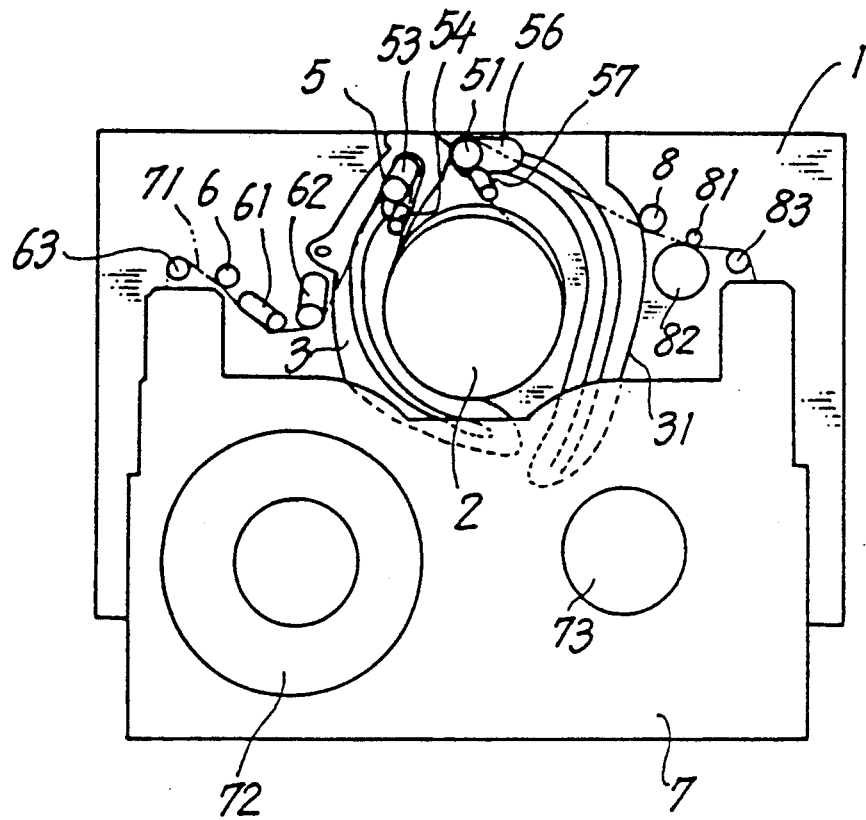

When the tape has been completely loaded as seen in FIG. 9, the guide assemblies 5 and 51 are at the terminal ends of the supply rail 3 and the take-up rail 31, respectively, and held in the specified posture as already stated. The pinch roller 82 holds the tape 71 in pressing contact with the capstan 81.

Consequently, the path of travel of the tape 71 is established, and the tape is wound around the head cylinder 2 at a predetermined lead angle and winding angle.

The tape 71 is unloaded through a process reverse to the above.

With the tape loading mechanism described above, the rails 3, 31 are each formed in a plane, and the tape guide assemblies 5, 51 each move along on the plane. This eliminates the need for the undesirable play of the the assemblies 5, 51 conventionally required, thereby precluding the assemblies from backlashing.

Figure 16:
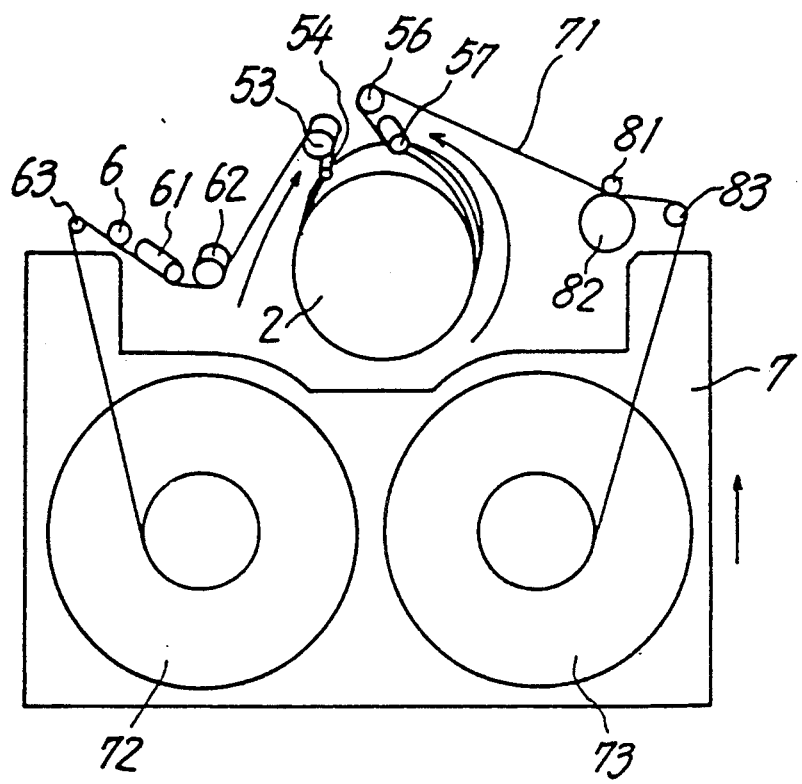
FIG. 16 is a plan view showing the path of travel of the tape in the loading mechanism of the invention.
Figure 17:
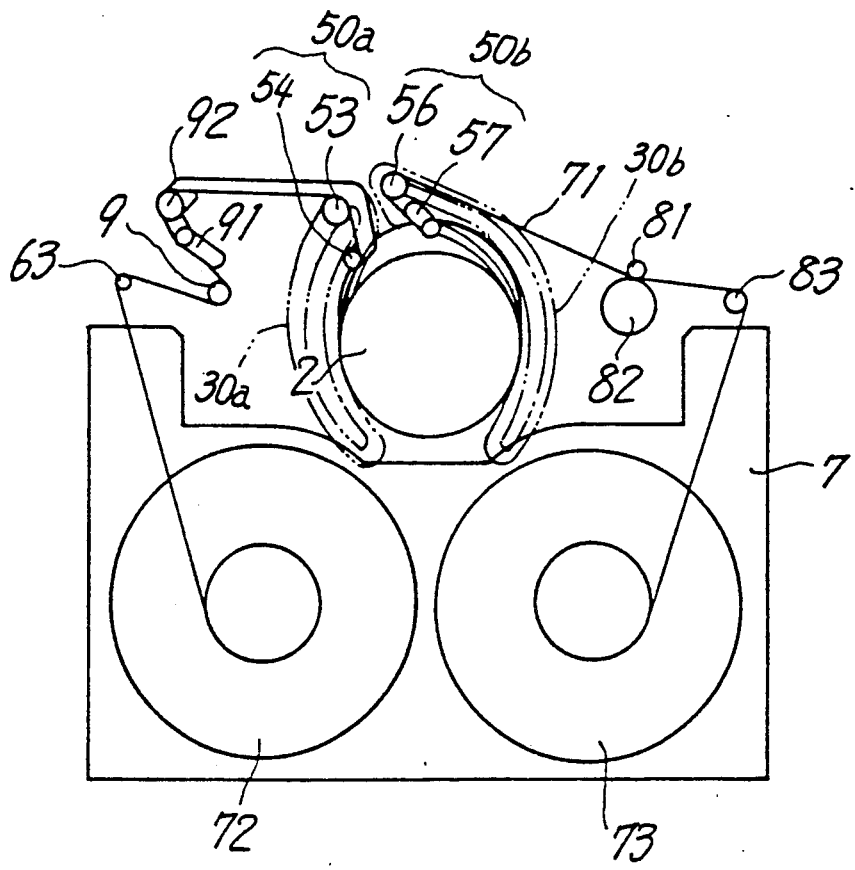
FIG. 17 is a plan view showing the path of travel of the tape in the conventional loading mechanism.
Figure 18:
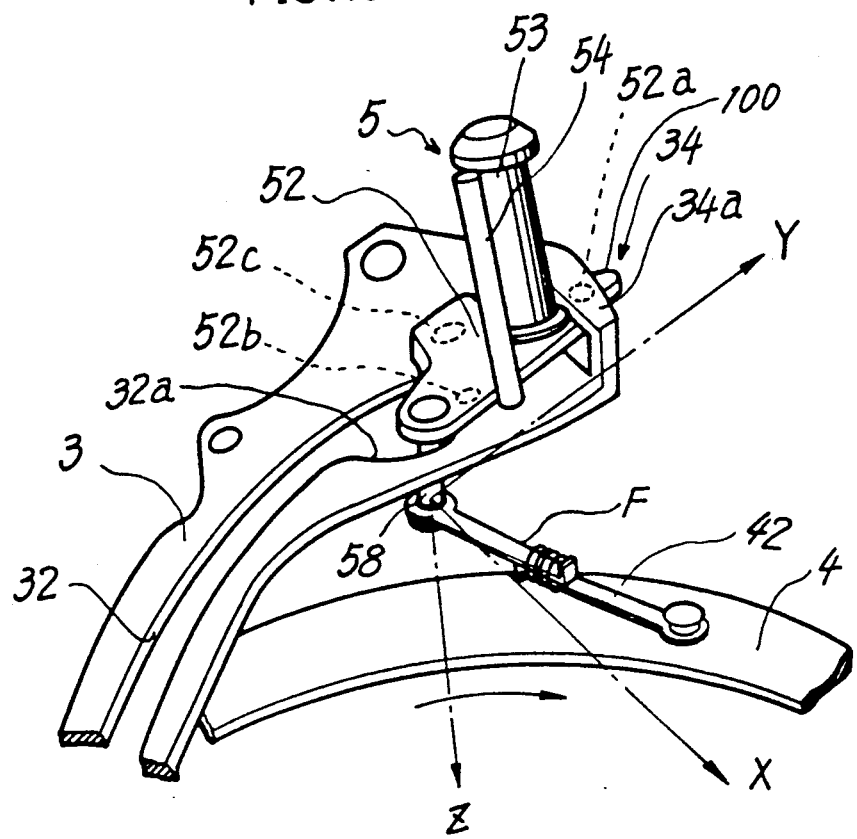
FIG. 18 is a perspective view showing the tape guide assembly in engagement with a stopper on a supply rail according to the invention.

Furthermore, the travel path for the tape as completely loaded is provided by the three fixed tape guides 6, 61, 62 in sliding contact with the magnetic side of the tape 71 as seen in FIG. 16, with the result that the VTR described is smaller in the number of movable tape guides than conventional ones (e.g., one disclosed in Unexamined Japanese Patent Publication SHO 60-74143). This serves not only to provide the tape travel path with higher accuracy than heretofore possible but also to simplify the tape loading mechanism.

The structures for connecting the tape guide assemblies 5, 51 to the respective loading rings 4, 41 comprise the pivot connection means shown in FIGS. 12 to 15 and adapted for rotation and pivotal movement, so that the tape guide assemblies 5, 51 are freely movable. Furthermore, the elastically stretchable connectors 42, 43 included render the assemblies 5, 51 accurately positionable at the end of their movement.

The supply rail 3 supported in a cantilever fashion and formed with the cutout 37 for absorbing external forces effectively obviates the likelihood that the stopper 34 for defining the position of the tape guide assembly 5 on completion of loading will be deformed by an external force.

Figure 24:
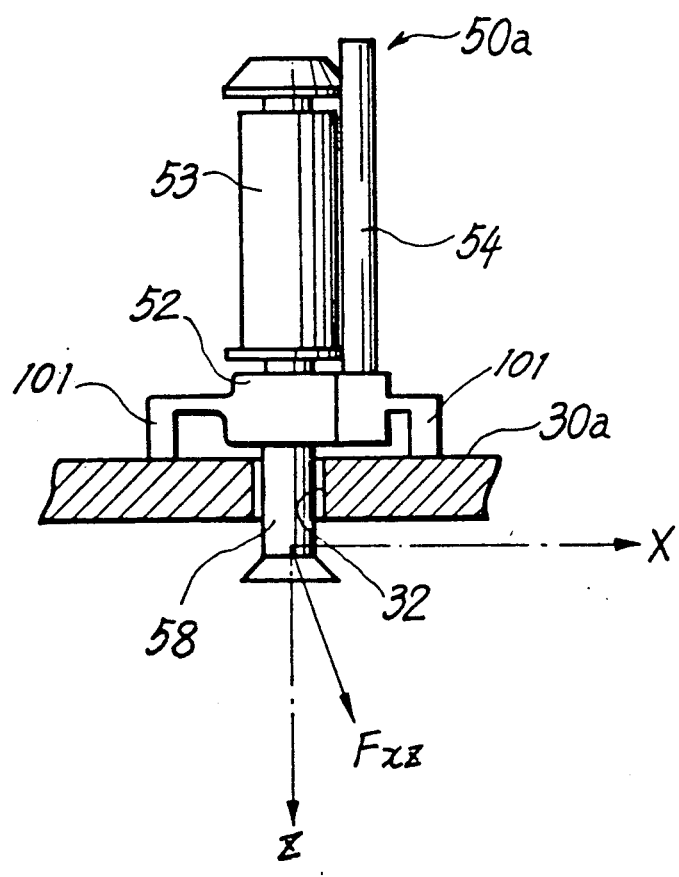
FIG. 24 is a front view partly broken away and showing a conventional tape guide assembly in engagement with a rail.

The tape guide assembly positioning arrangement shown in FIGS. 18 to 21 does not include the right slide piece 101 of the conventional arrangement shown in FIG. 24 but instead has the second protuberance 52b in the vincinity of the first rod 58. The second protuberance 52b primarily functions to realize a balance between the moments shown in FIG. 20 but is irrelevant to the balance between the moments of FIG. 21, so that the second protuberance 52b can be positioned close to the first rod 58 to the greatest possible extent to make the slide base 52 smaller in width than heretofore possible.

This makes it possible to install the rail 3 in close proximity to the head cylinder and to thereby provide a compacted tape loading mechanism.

The drawings and the embodiment described are intended for the illustration of the present invention and should not be construed as limiting or reducing the scope of the invention as defined in the appended claims.

The mechanism of the invention is not limited to the foregoing embodiment but can be modified variously by one skilled in the art without departing from the spirit of the invention described in the claims.

What is claimed is:

1. A tape loading mechanism including a head cylinder mounted inclined at a predetermined angle relative to a cylinder base, a pair of rails arranged around said head cylinder, a pair of tape drawing guides movable between positions inside and outside a tape cassette and a pair of tape guide assemblies each guidably movable along a tape guide assembly guide portion of a respective rail of said pair of rails for performing a tape loading operation comprising winding a magnetic tape around said head cylinder while withdrawing said tape from said tape cassette, said tape loading mechanism being characterized in that each said tape guide assembly guide portion of said respective rail of said pair of rails extends in a plane from a starting end close to said cassette to a terminal end close to said head cylinder, at least one of said rails being inclined relative to said cylinder base from said starting end positioned close to said cylinder base to said terminal end close to said head cylinder, with said starting end positioned close to said cylinder base being at a level lower than the level of tape within said cassette so as to maintain said tape guide assembly on said at least one of said rails at a lower level than said tape within said tape cassette when said tape loading operation is started, said inclined rail having said terminal end positioned away from said cylinder base so as to hold said tape guide assembly on said inclined rail at a higher level than said tape within said cassette on completion of said tape loading operation, said tape guide assembly on said inclined rail being movable into contact with said tape while moving on said inclined rail to withdraw said tape from said cassette.

2. A tape loading mechanism as defined in claim 1 wherein said tape in said cassette is on reels and said at least one inclined rail is disposed toward one of said reels of said cassette and the other rail of said pair of rails is disposed toward the other reel of said cassette and is parallel to said cylinder base.

3. A tape loading mechanism as defined in claim 1 wherein a tape drawing guide is provided on said cylinder base and is movable away from said cassette for loading said tape, said tape drawing guide being operable to withdraw said tape from said cassette first by contacting said tape drawing guide with said tape, and said tape guide assembly during a movement on said inclined rail subsequently reaches the same level as said tape while moving from said starting end of said at least one inclined rail close to said cassette and comes into contact with said tape.

4. A tape loading mechanism as defined in claim 1 wherein the end of each rail of said rails remotest from said cassette includes a stopper for defining an end position of movement of said tape guide assembly on said rail, and at least one of said rails has boss portions disposed in the vicinity of said stopper and fastened to said cylinder base and said boss portions are supported as a cantilever, a rail portion immediately adjacent to one of said boss portions and at the cassette side thereof being formed narrow deformably with a cutout.

5. A tape loading mechanism as defined in claim 1 wherein the end of each rail of said rails remotest from said cassette includes a stopper for defining an end position of movement of said tape guide assembly on said rail, and at least one of said tape guide assemblies has a slide base slidable on said rail and a rod projecting from said slide base and extending through a guide slit formed in said rail, said stopper defining an end position of movement of said tape guide assembly and having a plurality of contact portions including a contact portion on said slit defining side wall of said rail for contact with said rod, said side wall contact portion being edged in section perpendicular to a longitudinal direction of said guide slit for point contact with said rod.

6. A tape loading mechanism as defined in claim 1 wherein said pair of tape guide assemblies are each, respectively, connected to one of a pair of loading rings by a connector.

7. A tape loading mechanism as defined in claim 6 wherein said connector comprises first and second arms in engagement with each other and movable away and toward each other along an axis passing through the length of said two arms, and a spring between said two arms for biasing said tape guide assembly and holding said tape guide assembly at opposite end positions of movement on said rail on completion of said tape loading operation and on completion of a tape unloading operation.

8. A tape loading mechanism as defined in claim 6 wherein respective ends of said connector are connected to said rail and said loading ring by pivot connection means.

9. A tape loading mechanism including a head cylinder mounted at a predetermined first angle on a cylinder base, a pair of rails arranged around said head cylinder, at least one of said rails being inclined along its entire length at a second angle with respect to said cylinder base, and a pair of tape guide assemblies movable along respective of said rails to wind a tape having a magnetic side around said head cylinder, said tape loading mechanism being characterized in that three fixed tape guides for contact with said magnetic side of said tape are arranged on said cylinder base along a path of travel of said tape between said tape cassette and said tape guide assembly mounted on said inclined rail and positioned at the end of a movement on said inclined rail to a position remotest from said cassette, the first of said three fixed tape guides stands perpendicular to the cylinder base, the third of said fixed tape guides being inclined at the second angle, the second of said fixed tape guides being inclined at a predetermined third angle, said tape path of travel being changeable by the second of said three fixed tape guides positioned between the first and third of said fixed tape guides, said first and third fixed tape guides on opposite sides of said second tape guide being operable to determine the angle at which said tape is wound on said second fixed tape guide.

10. A tape loading mechanism including a head cylinder mounted on a cylinder base, a pair of arc shaped rails arranged around said head cylinder, at least one of said rails being inclined at a first angle relative to said cylinder base from a starting end position close to said cassette to a terminal end close to said head cylinder, a pair of tape guide assemblies mounted, respectively, on one rail of said rails and each tape guide assembly slidably engaged in a guide slit formed in said rail and extending longitudinally thereof, stopper means at a terminal end of each of said rails toward said head cylinder for defining an end position of movement of said guide assembly mounted thereon, and pulling drive means connected to each of said tape guide assemblies by a connector, said tape loading mechanism being characterized in that at least one of said tape guide assemblies has a slide base slidable on said rail and a rod projecting from said slide base and extending through said guide slit formed in said rail, said connector being connected to said rod, stopper means defining an end position of movement of said tape guide assembly upon completion of tape loading and having a plurality of contact portions including a contact portion on the slit defining side wall of said rail for contact with said rod, said side wall contact portion being edged in section perpendicular to the longitudinal direction of said guide slit for point contact with the rod.

* * * * *

UNITED STATES PATENT AND TRADEMARK OFFICE
CERTIFICATE OF CORRECTION

PATENT NO. : 5,089,921

DATED : February 18, 1992

INVENTOR(S) : KODAMA et al.

It is certified that error appears in the above-identified patent and that said Letters Patent is hereby corrected as shown below:

On the title page, Item [75], first line, "Yoshinisa" should read
—Yoshihisa—.

Signed and Sealed this

Thirty-first Day of August, 1993

Attest:

BRUCE LEHMAN

*Attesting Officer*    *Commissioner of Patents and Trademarks*